(12) United States Patent
Lu et al.

(10) Patent No.: US 11,475,879 B2
(45) Date of Patent: Oct. 18, 2022

(54) METHOD AND DEVICE FOR EVALUATING QUALITY OF CONTENT, ELECTRONIC EQUIPMENT, AND STORAGE MEDIUM (71) Applicant: BEIJING XIAOMI PINECONE ELECTRONICS CO., LTD., Beijing (CN)

(72) Inventors: Xiao Lu, Beijing (CN); Qun Guo, Beijing (CN); Erli Meng, Beijing (CN); Bin Wang, Beijing (CN); Hongxu Ji, Beijing (CN); Lei Sun, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 19 days.

(21) Appl. No.: 16/994,323

(22) Filed: Aug. 14, 2020

(65) Prior Publication Data
US 2021/0295827 A1 Sep. 23, 2021

(30) Foreign Application Priority Data

Mar. 20, 2020 (CN) .......................... 202010201888.0

(51) Int. Cl.
*G10L 15/14* (2006.01)
(52) U.S. Cl.
CPC .................................... *G10L 15/14* (2013.01)
(58) Field of Classification Search
CPC ....................................................... G10L 15/14
USPC ........................................................... 704/240
See application file for complete search history.

(56) References Cited

U.S. PATENT DOCUMENTS

| 5,371,807 A | 12/1994 | Register et al. |
| 2012/0032783 A1* | 2/2012 | Ahn ................ H04N 21/4424 340/6.1 |
| 2017/0046510 A1* | 2/2017 | Chen ..................... G06F 21/552 |
| 2018/0011931 A1* | 1/2018 | Modani ................ G06F 40/211 |
| 2018/0260490 A1* | 9/2018 | Shi ....................... G06F 16/9535 |

FOREIGN PATENT DOCUMENTS

| CN | 102163286 A | 8/2011 |
| CN | 104933055 A | 9/2015 |

OTHER PUBLICATIONS

Multimedia Answer Generation by Harvesting Web Information Liqiang Nie, Meng Wang, Yue Gao, Zheng-Jun Zha, and Tat-Seng Chua, (Year: 2013).*
Multimedia Answer Generation by Harvesting Web Information Liqiang Nie, Meng Wang, Yue Gao, Zheng-Jun Zha, and Tat-Seng Chua, (Year: 2013) (Year: 2013).*
Multimedia Answer Generation by Harvesting Web Information Liqiang Nie, Meng Wang, Yue Gao, Zheng-Jun Zha, and Tat-Seng Chua, (Year: 2013) (Year: 2013) (Year: 2013).*

(Continued)

*Primary Examiner* — Bharatkumar S Shah
(74) *Attorney, Agent, or Firm* — Arch & Lake LLP (57) ABSTRACT

Text content is determined. The text content is input to a content classifying model. The content classifying model is adapted to determine a probability of the text content belonging to a category. An evaluated value of quality of the text content is determined according to the probability of the category and a weight of the category. The weight represents importance of the category.

17 Claims, 7 Drawing Sheets

(56) References Cited

OTHER PUBLICATIONS

Z. Pei, X. Shi, M. Marchese and Y. Liang, "Text Categorization Method Based on Improved Mutual Information and Characteristic Weights Evaluation Algorithms," Fourth International Conference on Fuzzy Systems and Knowledge Discovery (FSKD 2007), 2007, pp. 87-91, doi: 10.1109/FSKD.2007.559. (Year: 2007).*
Extended European Search Report in the European Application No. 20193305.8 dated Oct. 5, 2020, (7p).

* cited by examiner

METHOD AND DEVICE FOR EVALUATING QUALITY OF CONTENT, ELECTRONIC EQUIPMENT, AND STORAGE MEDIUM

CROSS-REFERENCE TO RELATED APPLICATIONS

This application is based on, and claims benefit of priority to, Chinese Application No. 202010201888.0 filed on Mar. 20, 2020. Disclosure of the Chinese Application is hereby incorporated by reference in its entirety for all purposes.

BACKGROUND

At present, with rapid development of internet technology, explosive growth of content of multimedia may enrich work and life of a user. However, in reality there may be diverse content of multimedia varying in quality, including some vulgar content. Therefore, vulgar content in multimedia may have to be filtered out to increase quality of service data and manage quality of content efficiently.

SUMMARY

The subject disclosure relates to the field of data processing. Embodiments herein provide a method and device for evaluating quality of content, electronic equipment, and a storage medium.

According to an aspect herein, a method for evaluating quality of content includes:
  determining text content;
  inputting the text content to a content classifying model, wherein the content classifying model is adapted to determine a probability of the text content belonging to a category; and
  determining, according to the probability of the category and a weight of the category, an evaluated value of quality of the text content. The weight represents importance of the category.

According to an aspect herein, electronic equipment includes a processor and memory.

The memory is adapted to store a computer program executable by the processor.

The processor is adapted to implementing any method herein by executing the computer program in the memory.

According to an aspect herein, a non-transitory computer-readable storage medium has stored thereon a computer-executable program which, when executed, implements any method herein.

The above general description and detailed description below are but exemplary and explanatory, and do not limit the subject disclosure.

BRIEF DESCRIPTION OF THE ACCOMPANYING DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity.

Such a functional entity may be implemented in form of software, in one or more hardware modules or integrated circuits, or in different networks and/or processor devices and/or microcontroller devices.

In addition, a term such as "first", "second", etc., may serve but for description purposes and should not be construed as indication or implication of relevancy, or implication of a quantity of technical features under consideration. Accordingly, a feature with an attributive "first", "second", etc., may expressly or implicitly include at least one such feature. Herein by "multiple", it may mean two or more unless indicated otherwise expressly.

In related art, content may generally be classified into two categories according to a dichotomy. A probability of content belonging to a vulgar category is computed. The content is identified as vulgar content when the probability is greater than a threshold. The content is identified as normal content when the probability is less than the threshold. There is a risk that normal content identified according to the dichotomy and distributed to a user may include some vulgar content.

In view of this, embodiments herein provide a method for evaluating quality of content. A weight of a category may be determined beforehand. The weight may match the category. The weight may reflect a cost of the category with respect to a normal category. A probability of text content belonging to a category may be computed using a content classifying model. Then, an evaluated value of quality of the text content may be acquired according to the weight, thereby improving accuracy in identification.

Figure 1:
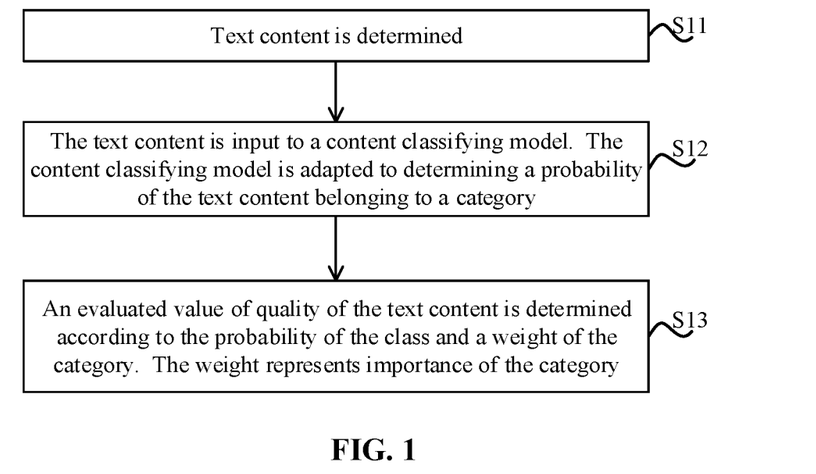
FIG. 1 is a flowchart of a method for evaluating quality of content according to an exemplary embodiment.

FIG. 1 is a flowchart of a method for evaluating quality of content according to an exemplary embodiment. The method applies to electronic equipment such as a smartphone, a tablet computer, a personal computer, a server, etc. Referring to FIG. 1, a method for evaluating quality of content includes S11 to S13.

In S11, text content is determined.

According to an embodiment herein, once turned on, electronic equipment may play a video, an audio, etc., and may display a multimedia file such as an image, text, etc. The multimedia file may include vulgar content such as pornographic content, bloody content, violence, etc. Therefore, quality of content therein may have to be managed before the file is distributed to a user, displayed after being downloaded to local user equipment, etc.

Content to be identified may be text. Electronic equipment may acquire the text content straightforwardly. Content to be identified may be non-text multimedia. Then, electronic equipment may acquire multimedia to be identified, and acquire text content representing content of the multimedia by identifying the multimedia. According to an embodiment herein, electronic equipment may obtain text content by identifying content in a video, an image, etc., using a preset algorithm such as image recognition, image identification, semantic analysis, etc. According to an embodiment herein, electronic equipment may obtain text content by identifying voice content of an audio using a voice identifying algorithm. According to an embodiment herein, content of text such as chat content, etc., may be acquired straightforwardly by resolving the text.

In S12, the text content is input to a content classifying model. The content classifying model is adapted to determine a probability of the text content belonging to a category.

According to an embodiment herein, a trained content classifying model may be stored beforehand in electronic equipment. The trained content classifying model may be adapted to outputting a probability of text content belonging to a category. The content classifying model may be implemented using an algorithm such as logistics regression (LR), a neural network such as a Recurrent Neural Network (RNN), a Convolutional Neural Network (CNN), etc., to which embodiments herein are not limited.

According to an embodiment herein, electronic equipment may input the text content to a content classifying model. The content classifying model may classify the text content and acquire a probability of the text content belonging to a category. For example, there may be 3 categories, i.e., a normal category, a pan-pornographic category, and a pornographic category. Then, the content classifying model may output a probability of a category being: the normal category (90%), the pan-vulgar category (10%), and the pornographic category (0).

Note that the embodiments herein are illustrated using 3 categories. In application, a person having ordinary skill in the art may adjust a number of categories, meaning of a category, etc., according to a scene. Such a solution falls in the protection scope of the subject disclosure.

In S13, an evaluated value of quality of the text content is determined according to the probability of the category and a weight of the category. The weight represents importance of the category. For example, the weight may be a relative value indicating the relative importance of the category compared with other categories. A higher value of importance usually has a greater weight compared with other categories.

According to an embodiment herein, a weight of a category may be stored beforehand in electronic equipment. The weight may be adapted to representing importance of the category with respect to another category. The weight may be acquired as follows.

First, a matrix of costs may be established, as shown in Table 1.

TABLE 1

| true | identified | | |
|---|---|---|---|
| | normal (0) | pan-vulgar (1) | pornographic (2) |
| normal (0) | C00 | C01 | C02 |
| pan-vulgar (1) | C10 | C11 | C12 |
| pornographic (2) | C20 | C21 | C22 |

Table 1 shows a case of 3 categories. A person having ordinary skill in the art may increase, according to a scene, the number of categories and a penalty coefficient between one category and another.

In Table 1, 0 may denote a normal category. 1 may denote a pan-vulgar category. 2 may denote a pornographic category. Then, Cxy may denote a penalty coefficient of a category x being identified as a category y. Here, both x and y may take on a value ranging from 0 to 2. When x=y, Cxy may denote a penalty coefficient of text content being classified correctly, which may be 0, or may be a set penalty coefficient. For example, a negative value may correspond to a rewarding coefficient. A solution herein is illustrated subsequently taking the value being 0.

A penalty coefficient C00 of a normal category being identified as normal may be 0. A penalty coefficient C01 may denote that a normal category is identified as pan-vulgar. A penalty coefficient C02 may denote that a normal category is identified as pornographic.

A penalty coefficient C10 may denote that a pan-vulgar category is identified as normal. A penalty coefficient C11 of a pan-vulgar category being identified as pan-vulgar may be 0. A penalty coefficient C12 may denote that a pan-vulgar category is identified as pornographic.

A penalty coefficient C20 may denote that a pornographic category is identified as normal. A penalty coefficient C21 may denote that a pornographic category is identified as pan-vulgar. A penalty coefficient C22 of a pornographic category being identified as pornographic may be 0.

According to an embodiment herein, a penalty coefficient may be adapted to denoting a penalty for identifying one category incorrectly as another. A penalty coefficient may be acquired through a result of identifying a category of text content.

For example, a penalty coefficient may be acquired by counting a historical result of identifying a category of text content. For example, results of identifying all text content within one month may be counted, with a parameter including, but not limited to money, a browsing duration, a number of clicks, a number of complaints, a number of comments, etc. Take a browsing duration as an example. A browsing duration in case of text content of a respective category being identified as of another category may be counted. A penalty coefficient may be acquired by taking, as a penalty for a category, a difference between a browsing duration in case of correct identification and a browsing duration in case of incorrect identification. For example, browsing of text content being identified correctly as pornographic may be blocked by a service. Thus, a browsing duration T1 of the content may be 0. When being identified incorrectly as of a normal category, the pornographic text content may be distributed to a user by the service. In this case, the browsing duration T2 may be of hundreds of minutes. Accordingly, a difference in the browsing duration may be (T2−T1). In this case, (T2−T1) may be taken as a penalty coefficient. Understandably, it may be difficult to identify a pan-vulgar category, as it is between the pornographic and the normal. Therefore, depending on a service, a pan-vulgar category may or may not be distributed. A browsing duration T3 corresponding to the pan-vulgar category may be between T1 and T2. Therefore, a difference in the browsing duration (T3−T1) may be less than the difference in the browsing duration (T2−T1). That is, a penalty coefficient of pornographic content being identified as of a normal category may be greater than a penalty coefficient of a pan-vulgar category being identified as normal.

In application, a penalty coefficient may be acquired by normalizing a difference in a browsing duration, thereby reducing a numerical value thereof, facilitating computation.

In another example, depending on a scene, a person having ordinary skill in the art may analyze a review indicator for reviewing quality of content, such as money, a browsing duration, a number of clicks, a number of complaints, a number of comments, etc. A penalty coefficient may be determined combining the review indicator and a rule of thumb of the scene.

In application, pornographic content being identified as normal and distributed to a user (a missed recall) may have a more serious impact than that of normal content being identified as pornographic content and recalled (an incorrect recall). Therefore, with embodiments herein, a penalty coefficient in Table 1 may be constrained as follows, thereby matching the penalty coefficient better to a scene.

C20>C21, denoting that a pornographic category being identified as normal may bring about a greater penalty than a pornographic category being identified as pan-vulgar.

C10>C12, denoting that a pan-vulgar category being identified as normal may bring about a greater penalty than a pan-vulgar category being identified as pornographic.

C02>C01, denoting that a normal category being identified as pornographic may bring about a greater penalty than a normal category being identified as vulgar.

C20>C02, denoting that a pornographic category being identified as normal may bring about a greater penalty than a normal category being identified as pornographic.

In other words, a penalty coefficient of content of a category being identified as of a first category may be greater than that of the content being identified as of a second category. Given that categories of content are sorted starting from a normal category to a vulgar category of a highest level, a distance of the first category to the normal category may be greater than a distance of the second category to the normal category. For example, a pornographic category being identified as normal may bring about a greater penalty than a pornographic category being identified as pan-vulgar.

Then, after a matrix of costs as shown in Table 1 is acquired, the weight may be acquired by a formula as follows.

$$d_m = C_{mx} / \sum_{i \in n-1} C_{ix} \qquad (1)$$

The $d_m$ may be a normalized penalty for an mth category, and represent the weight. The $C_{mx}$ may denote a penalty coefficient of content of the mth category being identified as of an xth category. The $C_{ix}$ may denote a penalty coefficient of content of an ith category being identified as of the xth category. The n may denote a number of pre-classified vulgar categories. A degree of vulgarity may increase with the i. The i may range from 0 to n−1.

According to an embodiment herein, having acquired a probability of a category, electronic equipment may acquire a weight of the category. The electronic equipment may compute, according to the probability and the weight, an evaluated value of quality of the category. The electronic equipment may take a sum of evaluated values of quality of all categories as an evaluated value of quality of text content corresponding to multimedia to be identified. It may be seen that a greater $C_{mx}$ may correspond to a greater $d_m$. According to the definition of $C_{mx}$, a weight of a category may grow with a degree of vulgarity. Accordingly, an ultimate result of classification may be biased, thereby increasing a penalty for a pornographic category being identified as another category, as well as a penalty for a pan-vulgar category being identified as normal, rendering a result of classification more reasonable, accurate.

An evaluated value of quality of text content may be acquired by a formula as follows.

$$D = \sum_{i \in n-1} d_i g p_i \qquad (2)$$

The D may denote the evaluated value of quality corresponding to a degree of vulgarity of the text content. The i may denote an ith category. The i may range from 0 to n−1. The $p_i$ may denote a probability of the category output by a content classifying model. The $d_i$ may denote a weight factor of the category.

Understandably, with embodiments herein, a weight may reflect a penalty to a category with respect to a normal category, as well as the degrees among different categories.

A weight may match a probability of a category better with the category, thereby acquiring a more appropriate evaluated value of quality.

According to an embodiment herein, a threshold may be provided within a service program in electronic equipment. A decision to block or distribute text content may be made based on the threshold and an evaluated value of quality.

So far, with embodiments herein, text content representing content of multimedia may be acquired. The text content may be input to a content classifying model. A probability of the text content belonging to a category may be acquired using the content classifying model. An evaluated value of quality of the text content may be acquired according to the probability of the category and a weight of the category. The weight may be adapted to representing importance of the category with respect to another category. With embodiments herein, a weight may reflect a cost of a category with respect to a normal category. A weight may match a probability of a category better with the category, thereby acquiring a more appropriate evaluated value of quality, improving accuracy in identification.

Figure 2:
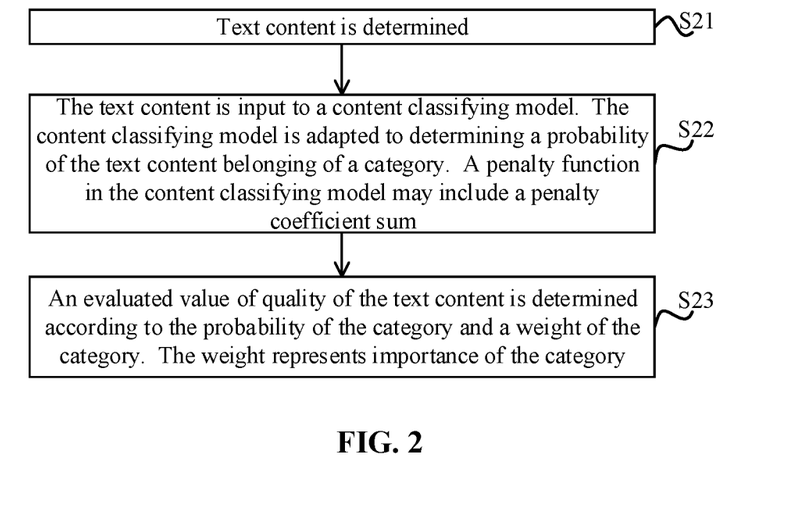
FIG. 2 is a flowchart of a method for evaluating quality of content according to an exemplary embodiment.

FIG. 2 is a flowchart of a method for evaluating quality of content according to an exemplary embodiment. The method is applicable to electronic equipment such as a smartphone, a tablet computer, a personal computer, a server, etc. Referring to FIG. 2, a method for evaluating quality of content may include S21 to S23.

In S21, multimedia to be identified may be acquired. Text content representing content of the multimedia may be acquired.

One may refer to content of S11 for content of an embodiment shown by S21, which is identical to that shown by S11, and is not repeated here.

In S22, the text content is input to a content classifying model. The content classifying model is adapted to determine a probability of the text content belonging to a category. A penalty function in the content classifying model may include a penalty coefficient sum.

One may refer to content of S12 for content of an embodiment shown by S22, which is similar to that shown by S12. A focus here is on a difference between S22 and S12 as follows.

According to an embodiment herein, the content classifying model may include a penalty function. Unlike related art, the penalty function may include a penalty coefficient sum. The penalty coefficient sum may represent a sum of any penalty coefficient of content of a category being identified as of a remaining category.

For example, a penalty function may be a cross entropy. A penalty function of a cross entropy in related art may be expressed by a formula as follows.

$$E_1 = -\sum_{i \in n} p_i g \log(p_i) \quad (3)$$

According to an embodiment herein, a penalty function of a cross entropy may be expressed by a formula as follows.

$$E_2 = -\sum_{i \in n} L_i g p_i g \log(p_i) \quad (4)$$

Compared to the formula (3), a penalty coefficient sum $L_i$ may be added in the formula (4). With the penalty coefficient sum $L_i$, a weight of a category in the content classifying model may be adjusted, such that the content classifying model may emphasize a pornographic category more, a pan-vulgar category less, and a normal category least, such that a weight may fit a category better.

According to an embodiment herein, the penalty coefficient sum may be acquired combining the matrix of costs as shown in Table 1 in S12, using a formula as follows.

$$L_i = \sum_{m \in n-1} C_{im} \quad (5)$$

The n may denote a maximal label of n+1 categories. The $L_i$ may denote the penalty coefficient sum of an ith category. The $C_{im}$ may denote a penalty coefficient of the ith category being identified as an mth category. The m may range from 0 to n−1.

$C_{ii}$ may be zero. That is, text content of the ith category may be identified as of the ith category. In this case, i=m may be excluded from the formula (5). Alternatively, $C_{ii}$ may be non-zero, i.e., a rewarding coefficient. In this case, i=m may be kept in the formula (5). A person having ordinary skill in the art may select to exclude or keep the case of i=m according to a scene, to which embodiments herein are not limited.

Figure 3:
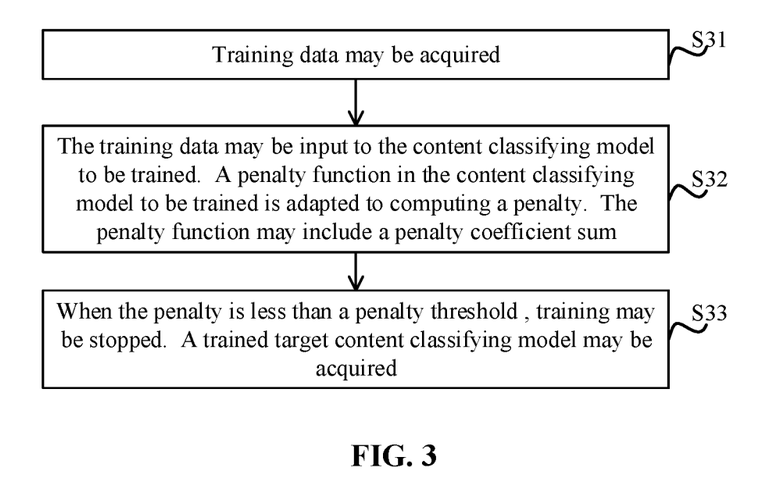
FIG. 3 is a flowchart of training a content classifying model according to an exemplary embodiment.

According to an embodiment herein, after adjustment is made according to a penalty coefficient, a content classifying model may be trained. Referring to FIG. 3, in S31, electronic equipment may acquire some training data. The training data may include text content, information marking the text content, etc. In S32, the electronic equipment may input the training data to the content classifying model to be trained. A penalty corresponding to a training datum may be computed using the penalty function in the content classifying model to be trained. In S33, the electronic equipment may compare the penalty to a penalty threshold. When the penalty is less than the penalty threshold, the electronic equipment may stop the training, and acquire a trained target content classifying model. The target content classifying model may be used subsequently to classify text content.

Understandably, with a penalty coefficient sum being added to a re-trained content classifying model, a parameter in the model may be adjusted, thereby adjusting a probability of a category output by the model. That is, the re-trained content classifying model may put more emphasis on vulgar content, and output a more accurate probability of a category.

In S23, an evaluated value of quality of the text content is determined according to the probability of the category and a weight of the category. The weight represents importance of the category.

One may refer to content of S13 for content of an embodiment shown by S23, which is identical to that shown by S13, and is not repeated here.

So far, with embodiments herein, a penalty coefficient sum may be added to a content classifying model, such that a more accurate probability of a category is output by the model, which, combined with a weight, allows a more accurate evaluated value of quality and a more accurate final category to be acquired, improving accuracy in identification.

Figure 4:
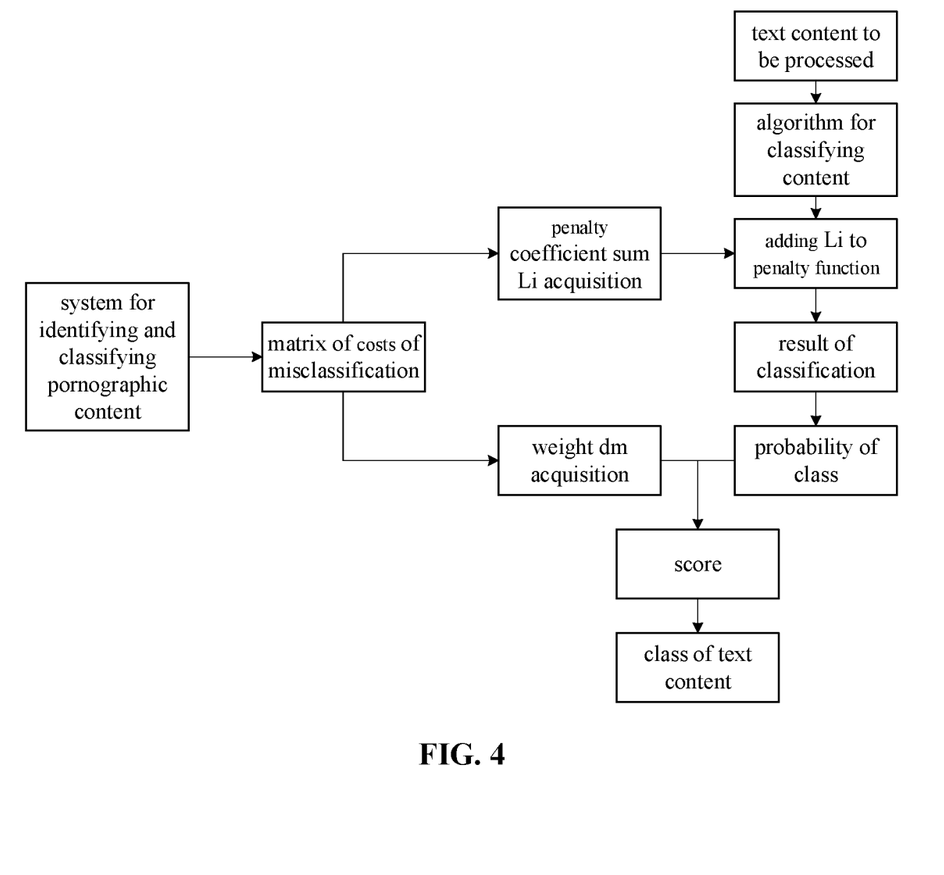
FIG. 4 is a diagram of a scene of application according to an exemplary embodiment.

A method for evaluating quality of content herein is illustrated below with a scene of identifying pornographic content. Referring to FIG. 4, first, a system for identifying and classifying pornographic content may be established, forming a matrix of costs of misclassification as illustrated in Table 1. Then, a penalty coefficient sum $L_i$ and a weight $d_m$ may be computed according to the matrix of costs. After that, the penalty coefficient sum $L_i$ may be added to a penalty function of a content classifying algorithm. The content classifying algorithm may be re-trained based on the new penalty function.

Finally, text content to be processed may be acquired. A probability of the text content belonging to a category may be acquired by inputting the text content to the re-trained content classifying algorithm. An evaluated value of quality may be computed combining an aforementioned weight. The evaluated value of quality may be taken as a parameter of the text content to be used by a subsequent program.

Figure 5:
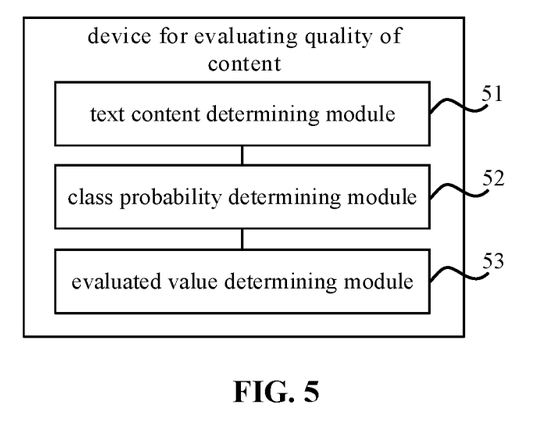
FIG. 5 is a block diagram of a device for evaluating quality of content according to an exemplary embodiment.

FIG. 5 is a block diagram of a device for evaluating quality of content according to an exemplary embodiment. The device is applicable to electronic equipment such as a smartphone, a tablet computer, a personal computer, a server, etc. Referring to FIG. 5, a device for evaluating quality of content includes a text content determining module, a category probability determining module, and an evaluated value determining module.

The text content determining module 51 is adapted to determine text content.

The category probability determining module 52 is adapted to inputting the text content to a content classifying model. The content classifying model is adapted to determine a probability of the text content belonging to a category.

The evaluated value determining module 53 is adapted to determine, according to the probability of the category and a weight of the category, an evaluated value of quality of the text content. The weight represents importance of the category.

According to an embodiment herein, the text content to be identified may be determined as follows.

When content to be identified is non-text multimedia, multimedia to be identified may be acquired.

Text content representing content of the multimedia may be acquired by identifying the multimedia.

According to an embodiment herein, the weight may be acquired by a formula as follows.

$$d_m = C_{mx} / \sum_{i \in n-1} C_{ix}.$$

The $d_m$ may be a normalized penalty for an mth category, and represent the weight. The $C_{mx}$ may denote a penalty coefficient of content of the mth category being identified as of an xth category. The $C_{ix}$ may denote a penalty coefficient of content of an ith category being identified as of the xth category. The n may denote a number of pre-classified vulgar categories. A degree of vulgarity may increase with the i.

According to an embodiment herein, the penalty coefficient may be acquired by counting a historical result of identifying the category of the text content. Alternatively, the penalty coefficient may be acquired using a rule of thumb.

According to an embodiment herein, a penalty coefficient of the text content being identified as of a normal category may grow with the degree of vulgarity of the text content.

According to an embodiment herein, the device may further include a classifying model training module. The content classifying model being trained may include a penalty function. The penalty function may include a penalty coefficient sum. The penalty coefficient sum may represent a sum of any penalty coefficient of content of a category being identified as of a remaining category.

According to an embodiment herein, the penalty coefficient sum may be acquired by a formula as follows.

$$L_i = \sum_{m \in n-1} C_{im}.$$

Then may denote a number of pre-classified vulgar categories. A degree of vulgarity may increase with the i. The $L_i$ may denote the penalty coefficient sum of an ith category. The $C_{im}$ may denote a penalty coefficient of the ith category being identified as an mth category.

Figure 6:
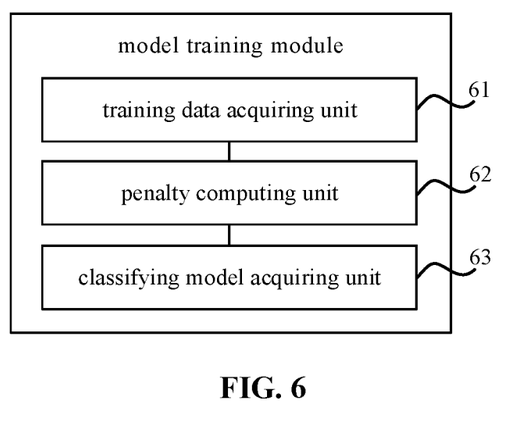
FIG. 6 is a block diagram of a device for evaluating quality of content according to an exemplary embodiment.

According to an embodiment herein, referring to FIG. 6, the device may further include a model training module. The model training module may include a training data acquisition unit, a penalty computing unit, and a classifying model acquisition unit.

The training data acquisition unit 61 may be adapted to acquiring training data.

The penalty computing unit 62 may be adapted to inputting the training data to the content classifying model to be trained. The penalty function in the content classifying model to be trained may be adapted to computing a penalty.

The classifying model acquisition unit 63 may be adapted to, in response to determining that the penalty is less than a penalty threshold, stopping training, and acquiring a trained target content classifying model.

Understandably, the device according to an embodiment herein may correspond to a method according to an embodiment herein. Refer to content of an embodiment relating to a method for content of the device, which is not repeated here.

Figure 7:
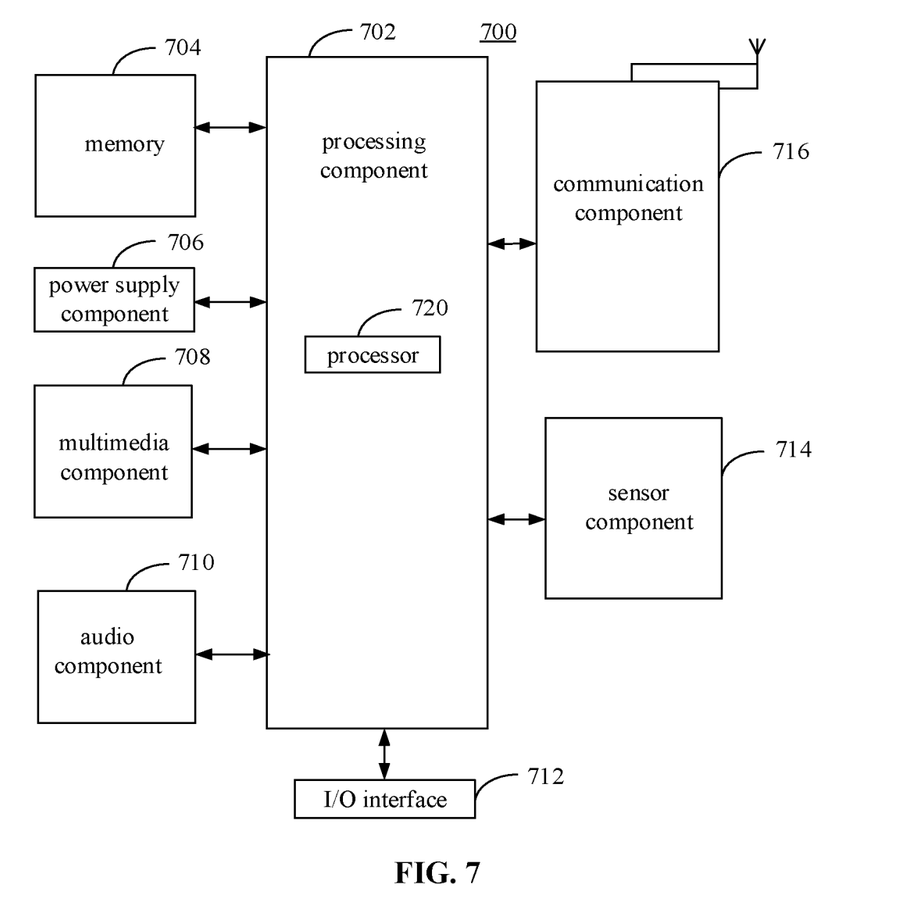
FIG. 7 is a block diagram of electronic equipment according to an exemplary embodiment.

FIG. 7 is a block diagram of electronic equipment according to an exemplary embodiment. For example, the electronic equipment 700 may be a smartphone/mobile phone, a computer, digital broadcast UE, messaging equipment, a gaming console, tablet equipment, medical equipment, fitness equipment, a personal digital assistant, etc.

Referring to FIG. 7, the electronic equipment 700 may include at least one of a processing component 702, memory 704, a power supply component 706, a multimedia component 708, an audio component 710, an Input/Output (I/O) interface 712, a sensor component 714, a communication component 716, an image collecting component 718, etc.

The processing component 702 may generally control an overall operation of the electronic equipment 700, such as operations associated with display, a telephone call, data communication, a camera operation, a recording operation, etc. The processing component 702 may include one or more processors 720 to execute a computer program so as to complete all or a part of an aforementioned method. In addition, the processing component 702 may include one or more modules to facilitate interaction between the processing component 702 and other components. For example, the processing component 702 may include a multimedia portion to facilitate interaction between the multimedia component 708 and the processing component 702.

The memory 704 may be adapted to store various types of data to support the operation at the electronic equipment 700. Examples of such data may include a computer program of any application or method adapted to operating on the electronic equipment 700, contact data, phonebook data, messages, pictures, videos, etc. The memory 704 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 706 may supply electric power to various components of the electronic equipment 700. The power supply component 706 may include a power management system, one or more power sources, and other components related to generating, managing, and distributing electricity for the electronic equipment 700. The power supply component 706 may include a power supply chip. A controller may communicate with the power supply chip, thereby controlling the power supply chip to turn on or off a switch device, such that a battery may provide power or no power to a circuit of a motherboard.

The multimedia component 708 may include a screen that provides an output interface between the electronic equipment 700 and an object. The screen may include a Liquid Crystal Display (LCD), a Touch Panel (TP), etc. If the screen includes a TP, the screen may be realized as a touch screen to receive a signal input by an object. The TP may include one or more touch sensors for sensing touch, slide, and gestures on the TP. The one or more touch sensors not only may sense the boundary of a touch or slide move, but also detect the duration and pressure related to the touch or slide move. The multimedia component 708 may include at least one of a front camera or a rear camera. When the electronic equipment 700 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 710 may be adapted to outputting and/or inputting an audio signal. For example, the audio component 710 may include a microphone (MIC). When the electronic equipment 700 is in an operation mode such as a call mode, a recording mode, a voice recognition mode, etc., the MIC may be adapted to receiving an external audio signal. The received audio signal may be further stored in the memory 704 or may be sent via the communication component 716. The audio component 710 may further include a loudspeaker adapted to output the audio signal.

The I/O interface 712 may provide an interface between the processing component 702 and a peripheral interface portion. Such a peripheral interface portion may be a keypad, a click wheel, a button, etc. Such a button may include but is not limited to at least one of a homepage button, a volume button, a start button, or a lock button.

The sensor component 714 may include one or more sensors for assessing various states of the electronic equipment 700. For example, the sensor component 714 may detect an on/off state of the electronic equipment 700 and relative positioning of components such as the display and the keypad of the electronic equipment 700. The sensor component 714 may further detect a change in the position of the electronic equipment 700 or of a component of the electronic equipment 700, whether there is contact between the electronic equipment 700 and an object, the orientation or acceleration/deceleration of the electronic equipment 700, a change in the temperature of the electronic equipment 700, etc. The sensor component 714 may include a proximity sensor adapted to detecting existence of a nearby object without physical contact. The sensor component 714 may further include an optical sensor such as a Complementary Metal-Oxide-Semiconductor (CMOS) or a Charge-Coupled-Device (CCD) image sensor used in an imaging application. The sensor component 714 may further include an acceleration sensor, a gyroscope sensor, a magnetic sensor, a pressure sensor, a temperature sensor, etc.

The communication component 716 may be adapted to facilitating wired or wireless communication between the electronic equipment 700 and other equipment. The electronic equipment 700 may access a wireless network based on a communication standard such as Wi-Fi, 2G, 3G . . . , or a combination thereof. The communication component 716 may broadcast-related information or receive a broadcast signal from an external broadcast management system via a broadcast channel. The communication component 716 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the electronic equipment 700 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, a non-transitory computer-readable storage medium including an executable program, such as memory 704 including instructions, may be provided. The computer-executable program may be executed by a processor. The computer-readable storage medium may be Read-Only Memory (ROM), Random Access Memory (RAM), Compact Disc Read-Only Memory (CD-ROM), a magnetic tape, a floppy disk, optical data storage equipment, etc.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:
1. A method for evaluating quality of content, comprising:
 determining text content;
 inputting the text content to a content classifying model, wherein the content classifying model is adapted to determine a probability of the text content belonging to a category; and
 determining, according to the probability of the category and a weight of the category, an evaluated value of quality of the text content, wherein the weight represents importance of the category with respect to another category,
wherein the method further comprises: acquiring the weight based on a formula $$d_m = C_{mx} / \sum_{i \in n-1} C_{ix},$$

wherein $d_m$ is a normalized penalty for an mth category, and represents the weight, wherein $C_{mx}$ denotes a penalty coefficient of content of the mth category being identified as of an xth category, wherein $C_{ix}$ denotes a penalty coefficient of content of an ith category being identified as of the xth category, wherein n denotes a number of pre-classified vulgar categories, wherein a degree of vulgarity increases with i, wherein i ranges from 0 to n−1.

2. The method of claim 1, wherein the determining the text content to be identified comprises:
in response to determining that content to be identified is non-text multimedia, acquiring multimedia to be identified; and
acquiring text content representing content of the multimedia by identifying the multimedia.

3. The method of claim 1, wherein the penalty coefficient is acquired by counting a historical result of identifying the category of the text content.

4. The method of claim 1, wherein a penalty coefficient of the text content being identified as of a normal category grows with the degree of vulgarity of the text content.

5. The method of claim 1, further comprising: training the content classifying model, wherein the content classifying model being trained comprises a penalty function, wherein the penalty function comprises a penalty coefficient sum, wherein the penalty coefficient sum represents a sum of any penalty coefficient of content of a category being identified as of a remaining category.

6. The method of claim 5, further comprising: acquiring the penalty coefficient sum based on a formula $$L_i = \sum_{k \in n-1} C_{jk},$$

wherein the degree of vulgarity increases with j, wherein $L_j$ denotes the penalty coefficient sum of a jth category, wherein $C_{jk}$ denotes a penalty coefficient of the jth category being identified as a kth category, wherein k ranges from 0 to n−1.

7. The method of claim 5, wherein training the content classifying model comprises:
acquiring training data;
inputting the training data to the content classifying model to be trained, wherein the penalty function in the content classifying model to be trained is adapted to computing a penalty; and
in response to determining that the penalty is less than a penalty threshold, stopping training, and acquiring a trained target content classifying model.

8. An electronic equipment, comprising one or more processors and memory,
wherein the memory is adapted to store a computer program executable by the one or more processors, wherein the one or more processors are configured to:
determine text content;
input the text content to a content classifying model, wherein the content classifying model is adapted to determine a probability of the text content belonging to a category; and
determine, according to the probability of the category and a weight of the category, an evaluated value of quality of the text content, wherein the weight represents importance of the category with respect to another category,
wherein the one or more processors are configured to acquire the weight based on a formula $$d_m = C_{mx} / \sum_{i \in n-1} C_{ix},$$

wherein $d_m$ is a normalized penalty for an mth category, and represents the weight, wherein $C_{mx}$ denotes a penalty coefficient of content of the mth category being identified as of an xth category, wherein $C_{ix}$ denotes a penalty coefficient of content of an ith category being identified as of the xth category, wherein n denotes a number of pre-classified vulgar categories, wherein a degree of vulgarity increases with i, wherein i ranges from 0 to n−1.

9. The electronic equipment of claim 8, wherein the one or more processor are configured to:
in response to determining that content to be identified is non-text multimedia, acquire multimedia to be identified; and
acquire text content representing content of the multimedia by identifying the multimedia.

10. The electronic equipment of claim 8, wherein the penalty coefficient is acquired by counting a historical result of identifying the category of the text content.

11. The electronic equipment of claim 8, wherein a penalty coefficient of the text content being identified as of a normal category grows with the degree of vulgarity of the text content.

12. The electronic equipment of claim 8, wherein the one or more processors are adapted to train the content classifying model, wherein the content classifying model being trained comprises a penalty function, wherein the penalty function comprises a penalty coefficient sum, wherein the penalty coefficient sum represents a sum of any penalty coefficient of content of a category being identified as of a remaining category.

13. The electronic equipment of claim 12, wherein the one or more processors are configured to acquire the penalty coefficient sum based on a formula $$L_i = \sum_{k \in n-1} C_{jk},$$

wherein the degree of vulgarity increases with j, wherein $L_j$ denotes the penalty coefficient sum of a jth category, wherein $C_{jk}$ denotes a penalty coefficient of the jth category being identified as a kth category, wherein k ranges from 0 to n−1.

14. The electronic equipment of claim 12, wherein the one or more processors are configured to:
acquire training data;
input the training data to the content classifying model to be trained, wherein the penalty function in the content classifying model to be trained is adapted to computing a penalty; and in response to determining that the penalty is less than a penalty threshold, stop training, and acquire a trained target content classifying model.

15. A non-transitory computer-readable storage medium, having stored thereon a computer-executable program which, when executed, implements a method for evaluating quality of content, the method comprising:

determining text content;

inputting the text content to a content classifying model, wherein the content classifying model is adapted to determine a probability of the text content belonging to a category; and determining, according to the probability of the category and a weight of the category, an evaluated value of quality of the text content, wherein the weight represents importance of the category with respect to another category, wherein the method further comprises: acquiring the weight based on a formula $$d_m = C_{mx} / \sum_{i \in n-1} C_{ix},$$

wherein $d_m$ is a normalized penalty for an mth category, and represents the weight, wherein $C_{mx}$ denotes a penalty coefficient of content of the mth category being identified as of an xth category, wherein $C_{ix}$ denotes a penalty coefficient of content of an ith category being identified as of the xth category, wherein n denotes a number of pre-classified vulgar categories, wherein a degree of vulgarity increases with i, wherein i ranges from 0 to n−1.

16. The storage medium of claim 15, wherein the determining the text content to be identified comprises:

in response to determining that content to be identified is non-text multimedia, acquiring multimedia to be identified; and acquiring text content representing content of the multimedia by identifying the multimedia.

17. The storage medium of claim 15, wherein the penalty coefficient is acquired by counting a historical result of identifying the category of the text content.

* * * * *